United States Patent [19]

Offer et al.

[11] 4,166,792

[45] Sep. 4, 1979

[54] IN-LINE FLUID FILTER

[75] Inventors: Robert J. Offer; James V. Dieringer, both of Racine, Wis.

[73] Assignee: Tenneco Inc., Racine, Wis.

[21] Appl. No.: 625,587

[22] Filed: Oct. 24, 1975

[51] Int. Cl.² .................. B01D 27/10; B01D 35/02
[52] U.S. Cl. ............................. 210/131; 210/446
[58] Field of Search ............ 210/131, 232, 435, 437, 210/446, 447, 450, 457; 285/256

[56] References Cited

U.S. PATENT DOCUMENTS

| 2,686,596 | 8/1954 | Storms | 210/446 X |
| 3,655,059 | 4/1972 | Johnson | 210/446 |

FOREIGN PATENT DOCUMENTS 1361176  4/1964  France ...................................... 285/256

*Primary Examiner*—William A. Cuchlinski, Jr.
*Attorney, Agent, or Firm*—Thomas E. Torphy; James R. Hagen

[57] ABSTRACT

An in-line hose connected filter assembly in which a one piece cylinder with swaged ends serves as the outer shell of the filter and also provides the material for crimping hose into sealing engagement with the filter assembly whereby the hose is mechanically secured to the filter inlet/outlet flow tube and serves as the seal between the outer shell and the inlet/outlet flow tube.

3 Claims, 3 Drawing Figures

IN-LINE FLUID FILTER

BACKGROUND OF THE INVENTION

Typically, permanently connected hose connections for in-line fluid filters are formed by providing a rigid fluid flow tube which extends outwardly from each end of the filter element outer shell or housing. A cup-like retainer is attached to the flow tube adjacent each end and a hose is inserted over the flow tube and forced axially over the tube until its end rests against the bottom of the cup-like retainer and a portion of the inner surface of the cup-like member is adjacent a portion of the periphery of the hose. The annular wall of the cup-like retainer is then forced radially inwardly, i.e. crimped, causing the hose to be compressed between the internal surface of the retainer and the external surface of the flow tube. The hose is thereby mechanically secured to and sealingly engaged with the flow tube.

Typically, a separate seal is required between the filter element outer shell or housing and the flow tube at each end of the shell or housing.

SUMMARY OF THE INVENTION

This invention relates to a fluid filter assembly of the in-line type having a one piece cylindrical outer shell with necked down or swaged ends which provide material for sealingly attaching a resilient conduit, such as a rubber hose, to each end of the filter assembly. The connection achieved by sufficiently radially inwardly swaging or crimping the swaged ends into sealing engagement with the hose serves to (1) provide a seal between the hose and the filter assembly, (2) mechanically maintain the hose and filter assembly in sealing engagement, and (3) provide a seal between the outer shell of the filter assembly and the inlet/outlet flow tube of the filter assembly.

DESCRIPTION OF THE PREFERRED EMBODIMENT

Figure 1:
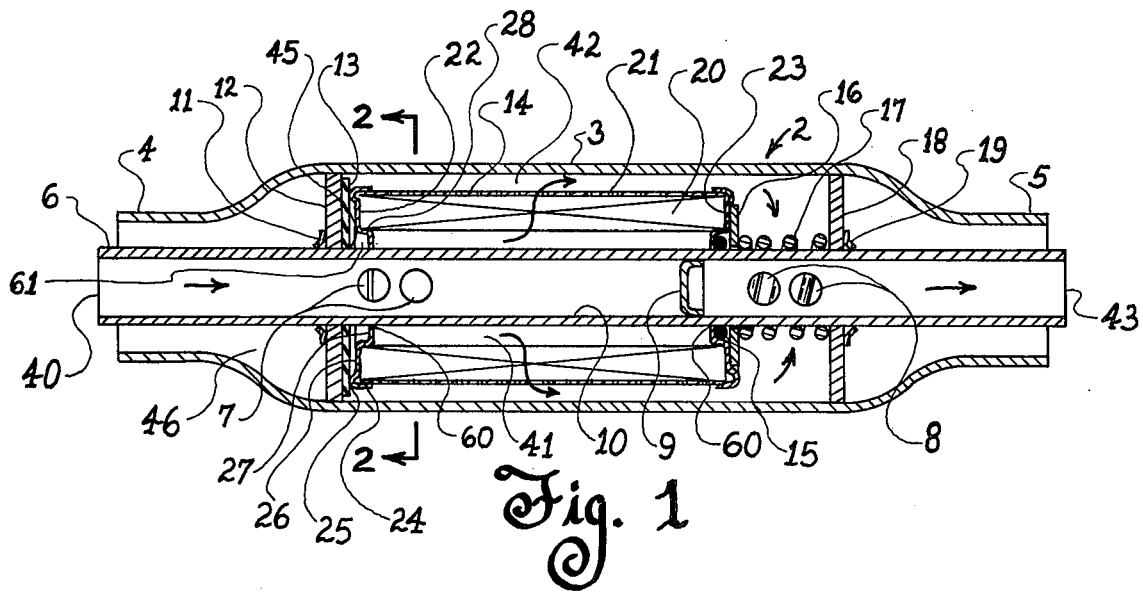
FIG. 1 is a full sectional view of a fluid filter assembly of this invention.

A filter assembly 2 shown in FIG. 1 has a one piece cylindrical outer shell 3 in which each a first or inlet end portion 4 and a second or outlet end portion 5 has been swaged or necked down to a smaller diameter relative to the unswaged central portion.

A subassembly, inserted before at least one of the end portions 4 or 5 is swaged down, is contained within assembly outer shell 3.

The subassembly is formed upon an inlet/outlet flow tube 6 having first or inlet flow openings 7, second or outlet flow openings 8 and tube plug 9. Tube plug 9 is press fit into tube 6 and therefore is substantially sealingly engaged with the interior circumferential surface 10 of tube 6 to prevent fluid flow through tube 6 between openings 7 and 8.

The remaining components of the subassembly are annular or cylindrical in form and each component has a central opening appropriately sized to receive the outside diameter of tube 6 within it.

These components are a first axial restraint means, such as push-on washer 11, a first subassembly spacer or support washer 12, a first resilient seal 13, a fluid treatment element assembly 14, a second resilient seal 15, a spring force support washer 16, a biasing means, such as helical spring 17, a second subassembly spacer or support washer 18 and a second axial restraint means, such as push-on washer 19.

The axial restraint means 11 and 19 shown in FIG. 1 are well known push-on type fasteners or washers which can readily be slid axially on a tubular member in one direction but, due to axially and radially inwardly oriented integral spring tabs having innermost ends which frictionally engage or "dig in" to the outer surface of the tube, the fastener or washer is restrained from movement in the opposite axial direction. Push-on washers 11 and 19 facilitate assembly of the subassembly for placement within cylindrical outer shell 13. The components of the subassembly are mounted on the tube 6 in the desired relationship and a push-on washer is forced over the end of the tube and pushed axially along the tube to the desired position adjacent a support washer. A desired degree of axial loading of spring 17 is effected during placement of at least one of the push-on washers. As each push-on washer inherently restrains itself from axial movement toward the end of the tube over which it was placed on the tube they hold the subassembly components in the desired position. However, other axial restraint means, such as welding, staking, etc. could be used to maintain support washers 12 and 18 in the desired axial position on tube 6.

Fluid treatment element assembly, such as filter element 14, is comprised of an annulus of a fluid treatment medium, such as pleated filter paper 20, a perforated element outer shell 21 which is generally formed of thin gauge metal or a relatively stiff but bendable paper, a first element end cap 22 and a second element end cap 23. End caps 22 and 23 are sealingly adhered to each a first and a second end, respectively of annular filter medium 20 to force fluid to go through the filter medium 20.

End caps 22 and 23 are identical in configuration, each having a substantially cylindrical peripheral band 24 for engagement with the outside circumference of the element outer shell 21, an integral rim portion 25 which extends axially outwardly away from the filter medium 20, an integral disc-like connector portion 26 and an integral interior spacer and support portion 27 which extends outward axially toward the filter element and thereby engages that portion of each of the inner pleat terminations 28 adjacent the end of the annulus of filter medium 20. A central opening 60 in each portion 27 fits loosely around flow tube 6, thus allowing element assembly 14 to slide axially on flow tube 6.

Figure 2:
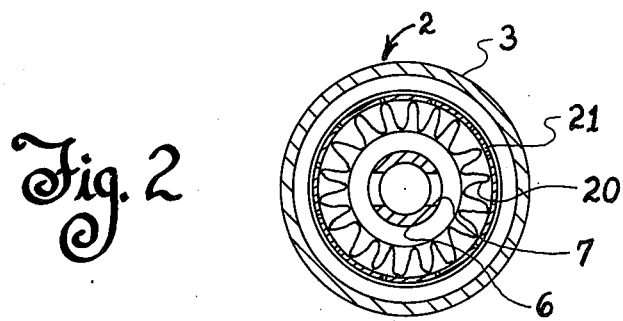
FIG. 2 is an end sectional view of a fluid filter assembly of this invention.

FIG. 2 shows how inlet opening 7 is arranged in tube 6 and illustrates in a sectional end view the arrangement of flow tube 6, the annulus of pleated filter medium 20, element outer shell 21 and filter assembly outer shell 3 within assembly 2 of FIG. 1.

Figure 3:
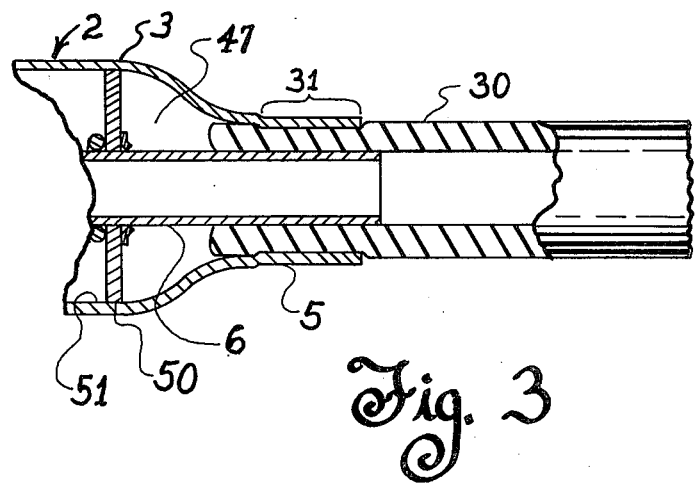
FIG. 3 is a sectional view of an end portion of the fluid filter assembly of this invention in which a swaged down outer shell end portion has been crimped into sealing engagement with a resilient conduit.

FIG. 3 shows the outlet end portion 5 of the assembly 2 shown in FIG. 1 in which a resilient conduit 30, such as a conventional rubber hose designed for use in hydraulic systems, has been inserted into the annular space between flow tube 6 and end portion 5 of shell 3. Radially inward crimping of end portion 5 in the area encompassed by bracket 31 compresses the walls of hose 30 into sealing engagement with filter assembly 2 and prevents axial withdrawal of the hose from the filter assembly.

In operation, the filter assembly of FIG. 1 would normally have a hose sealingly connected at each of its ends 4 and 5.

Fluid to be filtered flows through first or inlet end 40 of flow tube 6 to inlet openings 7 and through the inlet openings substantially laterally into annular chamber 41, where it is forced to flow radially outwardly through filter medium 20 into cavity 42. It then flows substantially laterally, relative to the axis of tube 6 through outlet openings 8 and to enter the outlet portion of tube 6 and then depart the assembly by flowing out the outlet end 43 of tube 6. This flow pattern is indicated by flow arrows in FIG. 1.

During fluid surges through the assembly 2 or when particulate matter plugs up the medium 20 to cause a predetermined resistance to flow through the medium it is desirable to have the fluid flow by-pass the filter element 14.

This by-pass function is described below. A biasing means, such as helical spring 17, via washer 16, urges filter element 14 axially along tube 6 toward resilient seal 13 whereby the integral rim portion 25 of end cap 22 is maintained in sealing engagement with resilient seal 13. Thus an expansible chamber 61 is formed between seal 13 and end cap 22. The inner opening 45 of seal 13 is sealingly engaged with the external surface of tube 6 so fluid cannot flow between the seal and the tube into cavity 46.

Upon occurance of fluid pressure within annular chamber 41 of element 14 which exceeds the predetermined force of spring 17 the attendant pressure in the expansible chamber 61 formed between seal 13 and end cap 22 overcomes the axially urging sealing force of spring 17 and forces element 14 axially along tube 6 away from seal 13. This axial movement breaks the seal between resilient seal 13 and end cap 22, whereby fluid can flow between the sealing surfaces of end cap 22 and seal 13 to by-pass filter medium 20 and thus limiting the resistance to flow to a desirable, predetermined level.

No fluid seal is present between the support washers and the inner surface of the outer shell. That is, referring to FIG. 3, no seal is present between the periphery 50 of support washer 18 and the interior surface 51 of shell 3. Therefore, fluid is normally present in assembly end cavities, such as cavity 47, during use of the filter assembly. The fluid in cavity 47 is prevented from leaking out of the filter assembly because hose 30 seals the annular space between shell 3 and tube 6.

The filter assembly of FIG. 1 may be assembled and shipped substantially as shown in FIG. 1 whereby an annular space is present at each end of the assembly for receiving a hydraulic hose. Upon installation of the hose the swaged down end portion of the outer shell would then be crimped radially inwardly to sealingly secure the hose in the annular space.

Alternately, a resilient hose may be inserted onto an end of tube 6 prior to swaging down the end portion of shell 3. The shell end portion can then be swaged down or radially inwardly sufficiently to sealingly secure the hose within the annular space between the tube and the end portion.

What is claimed is:

1. An in-line fluid filter assembly comprising:

an inlet/outlet tube having a first end, a second end, a continuous tube wall between said first end and said second end, at least one first fluid opening in said tube wall for enabling fluid flow laterally from said tube, at least one second fluid flow opening in said tube wall axially spaced along said tube wall from said first opening for enabling fluid flow laterally into said tube and seal means for preventing fluid flow through said tube between said first opening and said second opening;

a first spacer means on said tube and restrained from axial movement toward said first end of said tube;

a first seal means sealingly engaged with the peripheral surface of said inlet/outlet tube adjacent said first spacer means and covering substantially all of a surface of said first spacer means facing said second end of said tube;

a filter element comprising an annulus of a filter medium and having a first end sealingly engaged with a first element end cap adjacent said first seal means and a second end sealingly engaged with a second element end cap and said first fluid flow opening in said tube wall being surrounded by said filter element;

seal means sealingly engaging said second element end cap and the peripheral surface of said tube adjacent said second element end cap;

a second spacer means mounted on said tube and spaced axially away from said second element end cap and restrained from axial movement toward said second end of said tube;

spring means interposed between said second element end cap and said second spacer means for urging said filter element axially toward said first spacer means for causing sealing engagement between said first element end cap and said first seal means;

a tubular outer shell having an internal surface in contact with peripheral portions of each said first and said second spacer means for enveloping said filter element and substantially all of said inlet/outlet tube;

a first swaged down end portion of said outer shell concentric with and diametrically larger than said first end of said inlet/outlet tube for forming a first annular space between said shell and said tube;

a second swaged down end portion of said outer shell concentric with and diametrically larger than said second end of said inlet/outlet tube for forming a second annular space between said shell and said tube;

resilient conduit means sealing secured in said first annular space for directing fluid into said first end of said tube and preventing fluid flow through said first annular space; and resilient conduit means sealing secured in said second annular space for directing fluid out of said second end of said tube and preventing fluid flow through said second annular space.

2. An in-line fluid treatment assembly comprising:

one tube which serves as an inlet tube and an outlet tube for said assembly, said tube having a first end for receiving fluid flowing to said assembly and a second end for conducting fluid departing said assembly, a continuous tube wall between said first end and said second end, at least one first opening in said wall for enabling fluid to laterally exit from said tube, at least one second flow opening in said wall for enabling fluid to laterally enter said tube, and means between said first flow opening and said second flow opening for substantially preventing fluid flow through said tube between said first opening and said second opening;

means for treating fluid in fluid flow communication with said inlet tube, said means having an annulus of a pleated filter medium for removing particles from a fluid passing through said medium, said medium having a first element end and a second element end, a first element end cap mounted on said one tube between said first end of said tube and said first flow opening in said tube wall and sealingly engaged with said first element end of said annulus of pleated filter medium for maintaining said first element end of said annulus concentric with said one tube, a second element end cap mounted on said one tube between said first flow opening in said tube wall and said second flow opening in said tube wall and sealingly engaged with said second element end of said annulus of pleated filter medium for maintaining said second element end of said annulus concentric with said one tube;

first means for sealing between said one tube and said first element end cap and second means for sealing between said one tube and said second element end cap for causing fluid flowing from said first opening in said tube wall to flow through said annulus of pleated filter medium; and a tubular outer shell for enclosing said means for treating fluid and at least a portion of each said first end and said second end of said one tube, said shell comprising a first swaged down end portion concentric with and radially outwardly spaced from said inlet tube for defining a first annular space for receiving a first resilient fluid flow conduit and a second swaged down end portion concentric with and radially outwardly spaced from said outlet tube for defining a second annular space for receiving a second resilient fluid flow conduit.

3. An in-line fluid treatment assembly as defined in claim 2 having means for fluid flow by-passing of said means for fluid treatment comprising:

biasing means for urging said first element end cap into sealing engagement with said first means for sealing;

a fluid receiving, expansible chamber between said first means for sealing and said first element end cap for being expanded against the urging of said biasing means by fluid pressure above a predetermined amount for breaking the seal between said first means for sealing and said first element end cap for allowing fluid flow between said first means for sealing and said element end cap for enabling fluid flow from said first opening in said tube wall to by-pass said pleated filter medium.

* * * * *